W. SCOTT.
Blades for Agricultural Implements.

No. 146,026.  Patented Dec. 30, 1873.

Witnesses:
N. W. Almquist
Sedgwick

Inventor:
W. Scott
Per Munn & Co.
Attorneys.

UNITED STATES PATENT OFFICE.

WINFIELD SCOTT, OF FLOYD COURT-HOUSE, VIRGINIA.

IMPROVEMENT IN BLADES FOR AGRICULTURAL IMPLEMENTS.

Specification forming part of Letters Patent No. 146,026, dated December 30, 1873; application filed July 19, 1873.

*To all whom it may concern:*

Be it known that I, WINFIELD SCOTT, of Floyd Court-House, in the county of Floyd and State of Virginia, have invented a new and useful Improvement in Blades for Agricultural Implements, of which the following is a specification:

The object of this invention is to render hoes and other agricultural implements more durable than they have hitherto been; and it consists in making the outer corners of the blade thick and rigid, and making the blade thin, or bringing it to an edge between the corners, as hereinafter described.

Figure 1:
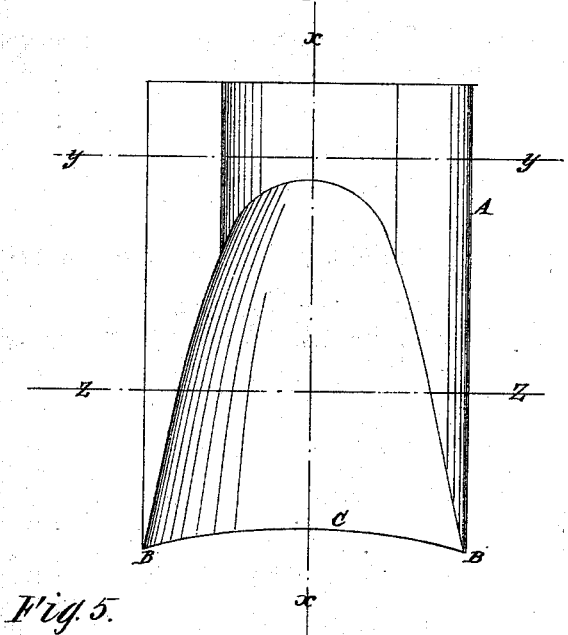
Figure 2:
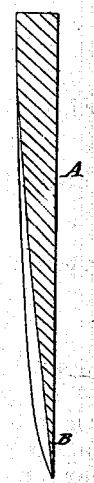
Figure 5:
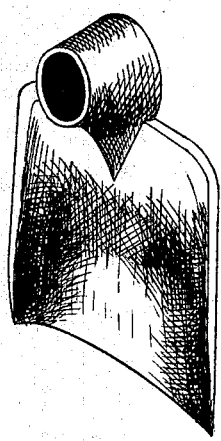
Figure 3:
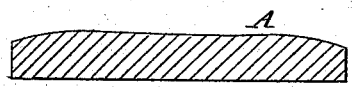
Figure 4:
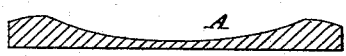
Figure 6:

In the drawing, Figure 1 is a view of the upper side of the blade. Fig. 2 is a longitudinal section taken on the line $x\,x$ of Fig. 1. Fig. 3 is a cross-section of the blade, taken on the line $y\,y$ of Fig. 1. Fig. 4 is a cross-section of the blade, taken on the line $z\,z$ of Fig. 1. Figs. 5 and 6 are perspective views of hoes with blades constructed upon my plan.

Similar letters of reference indicate corresponding parts.

A is the blade. B B are the corners or points. C is the edge, which, in form, is the arc of a circle, and is the base of a longitudinal section of a cone hollowed out from the face of the blade, substantially as represented in the drawing. The corners B B are brought to a point, so that they resemble picks with a sharp cutting-edge between them. This conformation gives great strength to the blade, and allows the implement to be used for a great variety of purposes, and to the greatest advantage, and insures its strength and durability.

Having thus described my invention, I claim as new and desire to secure by Letters Patent—

In an agricultural implement, the blade A, having its inner surface and cutting-edge concave, and the thickened sides or points B, all as shown and described.

WINFIELD SCOTT.

Witnesses:
JAMES M. BOYD,
J. F. AKERS.